July 25, 1961 R. H. BRILL ET AL 2,993,388
DRIVE MECHANISM

Filed July 13, 1959 2 Sheets-Sheet 1

INVENTORS
RICHARD H. BRILL
GEORGE J. REED
BY
Harry W. Hargis III
AGENT

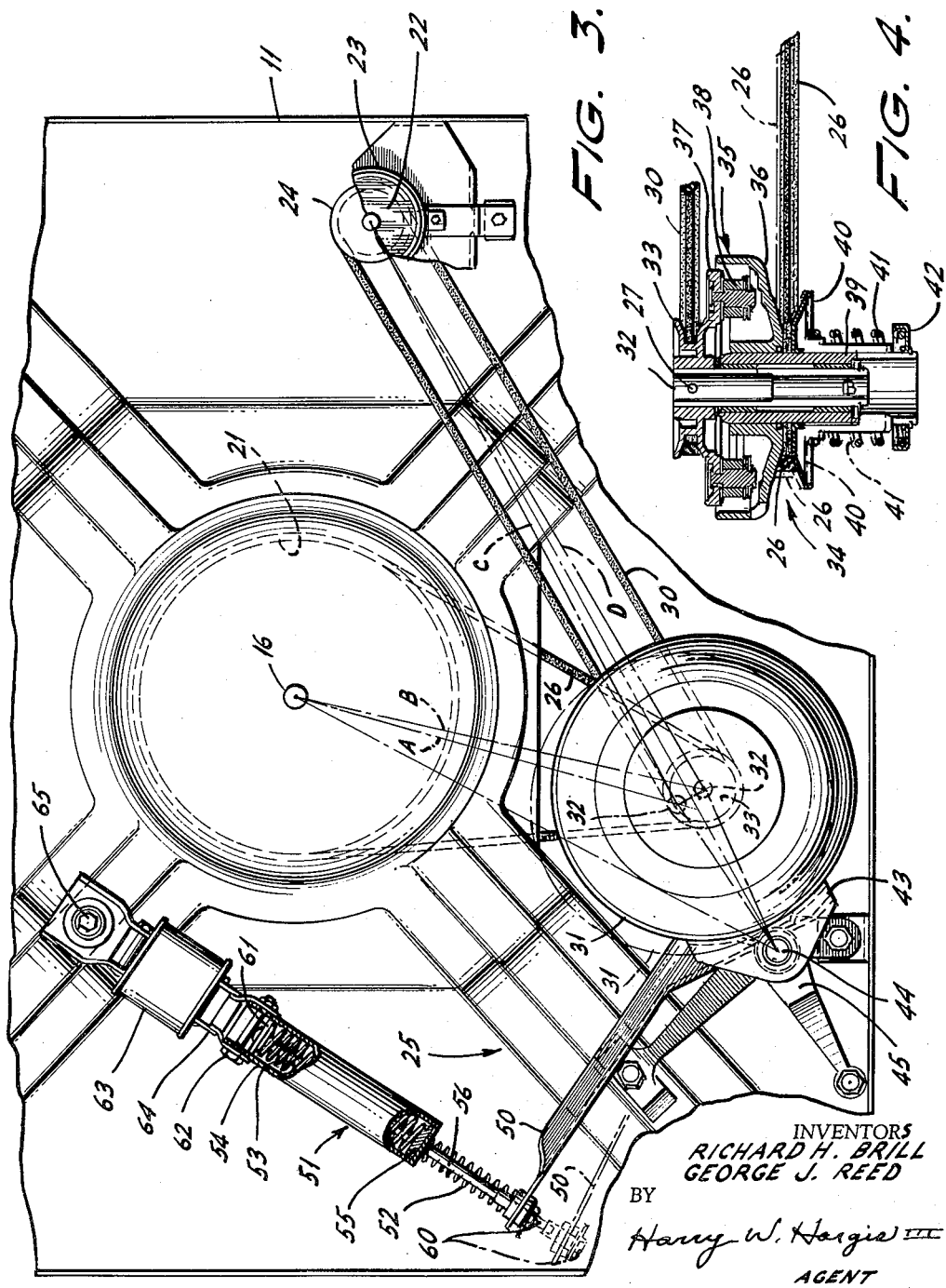

United States Patent Office 2,993,388
Patented July 25, 1961

2,993,388
DRIVE MECHANISM
Richard H. Brill, Philadelphia, Pa., and George J. Reed, Santa Fe Springs, Calif., assignors to Philco Corporation, Philadelphia, Pa., a corporation of Pennsylvania
Filed July 13, 1959, Ser. No. 826,741
9 Claims. (Cl. 74—722)

The present invention relates to drive mechanisms, and more particularly to multi-speed transmission assemblies.

While of broader applicability, apparatus of the present invention is particularly adapted for driving laundry apparatus such, for example, as domestic washing machines.

Apparatus of the foregoing type normally is driven at low agitating speeds, to force washing fluid through fabrics being laundered, and is driven at accelerated centrifuging speeds to remove washing fluid from the fabrics. When washing certain synthetic fabrics such, for example, as orlon and nylon, it has been found desirable to operate at lower agitating and centrifuging speeds than normally are required for regular fabrics such, for example, as cotton and linen.

It is therefore an object of the invention to provide a drive mechanism for laundry apparatus affording a selection of different agitating and centrifuging speeds.

It is also an object of the invention to provide a simple and effective variable speed transmission.

It is another object of the invention to provide speed changing mechanism requiring a minimum of actuating linkages.

Still another object of the invention is to provide an improved variable speed belt-driven transmission.

The invention is featured by the fact that it enables a reversible single speed motor to drive the apparatus, selectively, at two agitating speeds and two centrifuging speeds.

In achievement of the foregoing and other objectives, a preferred embodiment of the invention contemplates, in the belt-driven transmission of a laundry machine, provision of a driving pulley and a driven pulley, one of which is formed in two sections connected for rotation together. One of the sections is movable axially while urged toward the other section by a spring, thereby to provide for varying the effective diameter of the pulley. A driving belt engages the pulleys, and means operative to regulate the axial position of the movable section includes belt tensioning means having a pair of springs, each selectively actuatable independently of the other to tension the belt. One of the springs exerts a force greater than the resilient means associated with the pulley, thereby moving its movable section and changing the effective diameter of the pulley to vary the speed of the driven pulley. The driven pulley is disposed and adapted, selectively, to drive either the agitator or the centrifuging mechanism of the machine, and at such different speeds as are determined by modifying tension in the belt.

The manner in which the foregoing as well as other objects and advantages of the invention can best be achieved will be understood upon consideration of the following description, taken in conjunction with the accompanying drawing wherein:

FIGURE 3 is a top plan view of apparatus seen in FIGURE 2, with parts removed for purposes of clarity; and FIGURE 4 is a sectional showing of combined split pulley and clutch means embodied in apparatus seen in FIGURE 2.

Figure 2:
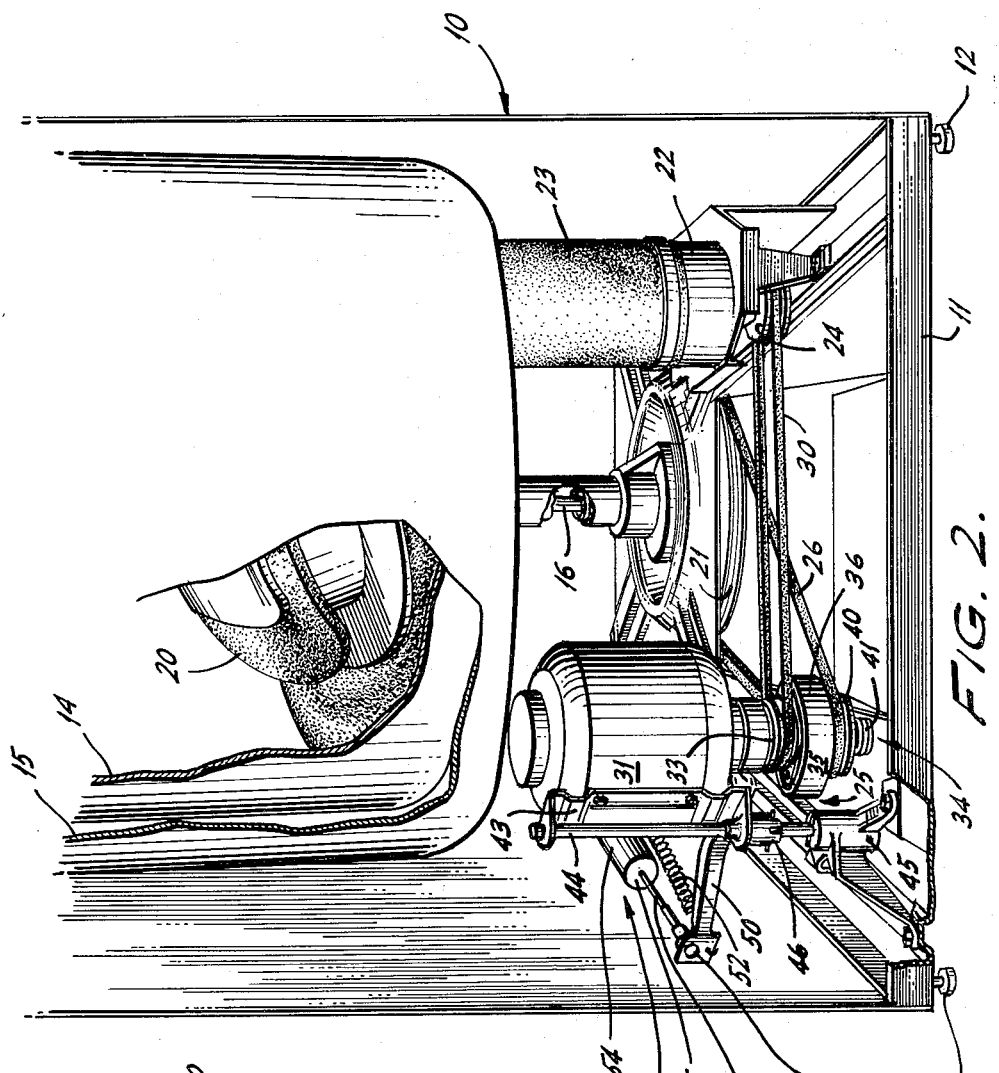
FIGURE 2 is a perspective showing, with parts broken away, of the apparatus shown in FIGURE 1 as viewed from the rear.
Figure 1:
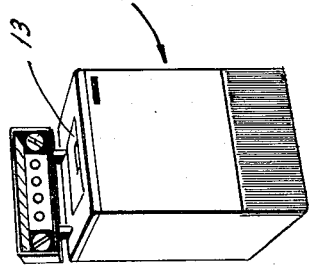
FIGURE 1 is a perspective showing of laundry apparatus embodying the invention.

Now making more particular reference to the drawings, and first to FIGURES 1 and 2, a washing machine embodying the present invention includes an outer cabinet 10 supported upon a base member 11 provided with conventional leveling feet 12. A door 13 disposed in the upper horizontal wall of cabinet 10 provides access to an upwardly presented rotatable tub 14 which is nested within and spaced from an outer tub 15 mounted within cabinet 10. A drive shaft 16 extends through the bottom portion of each tub and the upper portion thereof (not shown) is disposed within rotatable tub 14, while the lower end portion thereof is disposed below base member 11. The upper end portion of the shaft drives a wobble-plate agitator 20 when the shaft is driven in one direction, and tub 14 is rotated with the agitator when the shaft is driven in the opposite direction. While a detailed description of clutch apparatus providing for this mode of operation, as well as additional structural features of the agitator and rotatable tub is not necessary to an understanding of the present invention, reference may be had, for a complete description of such apparatus and by way of example, to the copending application of George C. Fields entitled "Drive Mechanism," bearing Serial No. 740,157, filed June 5, 1958, now Patent No. 2,924,086, and assigned to the assignee of the present invention. A pulley 21 is affixed to the above mentioned lower end portion of shaft 16 and imparts the desired rotational movements to the shaft under the actuation of the novel drive mechanism to be hereinafter fully described.

Making reference also to FIGURES 3 and 4, a wash-fluid drain pump 22 is mounted upon base member 11, as shown, and is disposed in fluid flow communication with flexible sump portion 23 of outer tub 15. Pump 22 is of a known impeller-type adapted to be driven by a pulley 24, to drain fluid from the tub.

In particular accordance with the invention, there is provided motor and transmission means 25 for driving pulley 21 at different agitating and centrifuging speeds, while providing for drive of pulley 24 at constant speed. Said means 25 includes a drive belt 26 for pulley 21 and a drive belt 30 for pulley 24. Each of drive belts 26 and 30 is driven from the shaft 32 of reversible, constant speed motor 31, through the agency of axially aligned pulleys 33 and 34 rotatable with the constant speed motor shaft.

As best seen in FIGURE 4, pulley 33 drives pump belt 30, is of the fixed type, and is conventionally keyed to shaft 31 by means of a pin 27. A centrifugally actuatable clutch 35 includes portion 37 of pulley 33. Centrifugally operable friction elements 38 of the clutch are mounted upon portion 37 and are adapted releasably to engage portion 36 of pulley 34 to drive the same, pulley 34 being adapted to turn freely upon shaft 32 when not driven with pulley 33. The directional clutch having been explained in said Fields disclosure, the construction and arrangement of clutch 35 is such that driving motor 31 in a left-hand direction, as viewed in FIGURE 3 and provided by conventional switching control means well known in the art, causes pulley 34 to be driven with some slippage relative to shaft 32 to spin tub 14 through the agency of the belt 26. Driving the motor in a right hand direction, to operate agitator 20, causes pulley 34 to be driven without slippage relative to shaft 32.

Pulley 34 is of the adjustable or split type and comprises in part the conical portion 36 of clutch 35. The other half of pulley 34 comprises a conical portion 40 splined to a sleeve-like member 39 of pulley portion 36 and axially movable along the said member. A spring 41 reacts between a flange portion 42 of member 39 and the concave region of pulley portion 40, to urge the latter toward its other portion 36 and against lateral faces of belt 26.

In the broken line showing of FIGURE 4 pulley 34 is conditioned, for driving belt 21 at its higher speed thereby to provide either high speed agitator drive or high speed tub rotation, as determined by the direction of motor rotation. The full line showing indicates relative positions of pulley halves 36—40 and belt 21 whereby either low speed agitator drive or tub rotation is effected.

As best seen in FIGURE 2, motor 31 is pivotally supported by a bracket 43 upon a vertically extending pin 44 mounted upon base 11 through the agency of a tripod bracket 45. Vertical support of the motor, as well as proper elevation thereof to ensure proper belt and pulley alignment, is provided by an adjustably positioned thrust member 46 carried by pin 44 and disposed in abutting engagement with bracket 43.

An arm 50, preferably a channel member, extends away from bracket 43 (see also FIGURE 3) and is operable in a horizontal plane between positions shown in full and broken lines to pivot the motor, between positions (also indicated by full and broken line showings, FIGURE 3) about pin 44 whereby motor shaft 32 is moved transversely about pin 44 as an axis. Movement of shaft 32 between the positions shown, in response to movement of arm 50, is sufficient to change the tension in belt 26 between predetermined limits, thereby to cause section 40 of pulley 34 to be moved axially to the positions shown in broken and full lines in FIGURE 4, either against the force of spring 41 when the belt is tightened (full lines) or under the influence of the spring when the belt is loosened (broken lines).

Positioning of arm 50 is effected by belt tensioning means 51 including a spring 52 that is tensioned between the end of arm 50 and the base member 11, the latter point being obscured in the drawing. Means 51 includes also a second spring 53 disposed within a tubular housing 54 and abutting end wall 55 thereof. A rod 56 extends through an opening in wall 55. End portion 60 of the rod is affixed to the end of arm 50 as shown, and flanged end portion 61 of the rod is disposed in abutting engagement with the other end of spring 53 as shown. A pin 62 extends through housing 54 and the plunger 64 of a solenoid device 63. Solenoid device 63 is pivotally mounted, as seen at 65, to base member 11 and is electrically actuatable, by known means, either, to extend or retract the plunger 64. Extending the plunger relaxes spring 53 whereby the force of compressed spring 41 against pulley section 40 causes the latter to be wedged against the angular face of belt 26, thereby effecting relative radial movement between the pulley 34 and belt 26 to the positions shown in broken lines in FIGURE 4. This movement is sufficient to pivot the motor to the position shown in broken lines, in which position belt tensioning is effected by spring 52.

Retracting the plunger compresses spring 53 between flange 61 and wall 55 thereby moving rod 56 and causing the motor to be pivoted to the full line showing thereof. Movement of the motor under the action of spring 53 causes belt 26 to be tensioned an amount sufficient to overcome the force of pulley spring 41, whereby belt drive is effected as seen in the full line showing of FIGURE 4.

In the illustrated positions of the motor the distances (as indicated by broken lines A and B) between pulley shafts 16 and 32 differ substantially, while there is no change in the distances (broken lines C and D) between pulley shaft 32 and pulley 24. This relationship is borne out by the fact that shaft 32 is movable the same distance to either side of a line connecting pivot 44 and the center of pulley 24, whereas the positions of shaft 32 lie to the same side of a line connecting pivot 44 and shaft 16. This arrangement advantageously affords simple and effective multispeed transmission means not only adapted for operating combined clothes washing and centrifuging equipment but also adapted for operating auxiliary components to be driven at fixed speeds. Also, by virtue of the geometry of the pulley arrangement, positive speed control can be had for a portion of a multi-pulley drive without affecting the other portion, merely by changing the position of the common drive shaft.

It will be understood that such modifications may be made in the illustrated embodiment as are contemplated by the scope of the appended claims.

We claim:

1. Drive mechanism comprising: a driving pulley and a driven pulley, one of said pulleys being formed in two sections connected for rotation together, one of said sections being movable along the pulley axis; resilient means associated with said pulley which has two sections, and disposed and adapted to urge the axially movable section toward the other section; a driving belt engaging said pulleys; and belt tensioning means operative to regulate the axial position of the said movable pulley section, including a pair of springs, each selectively actuatable independently of the other and being disposed and adapted to tension said belt, one of said springs being actuatable to exert a tensioning force overcoming the resilient means associated with one of said pulleys.

2. In combination with a single speed motor, and a shaft to be driven at a plurality of speeds, transmission means providing a driving connection between said motor and said shaft, comprising: a first pulley carried by said shaft and adapted to drive the same; a second pulley disposed and adapted to be driven with said motor, and formed in two sections, one of said sections being movable along the pulley axis to vary the effective diameter of the pulley; resilient means disposed and adapted to urge the axially movable pulley section toward the other section; a driving belt engaging said first and second pulleys; and belt tensioning means operative to regulate the axial position of the said movable pulley section to vary the diameter of said second pulley and including a pair of springs, each selectively actuatable independently of the other and being disposeed and adapted to tension said belt, one of said springs upon actuation thereof exerting a tensioning force overcoming the said resilient means.

3. In combination: a motor; a motor shaft; means pivotally mounting said motor for movement about an axis spaced transversely from said shaft; a split pulley carried by said shaft and including a pair of sections relatively movable between a pair of positions spaced along said shaft; means normally resiliently urging said sections toward one another; a driven pulley; a drive belt interconnecting said split pulley and said driven pulley; and means operative to pivot said motor between a pair of positions, comprising spring means disposed and adapted resiliently to urge said motor about its pivot to one of said portions, the belt when the motor is in said one position being driven by said split pulley when its sections are in one of their said pair of positions, the motor in the other of said positions tensioning the belt in an amount sufficient to urge said split pulley sections apart to another of said pair of positions, thereby to cause drive of said belt by a lesser effective diameter of said split pulley; and means for increasing the force exerted by said spring means to move the motor to its said other position thereby to increase the belt tension an amount sufficient to provide for urging said split pulley sections apart.

4. In combination, a motor, a motor shaft, means pivotally mounting said motor for movement about an axis spaced transversely from said shaft, a split pulley carried by said shaft and including a pair of sections relatively movable between a pair of positions spaced along said shaft, means normally resiliently urging said sections toward one another, a driven pulley, a drive belt interconnecting said split pulley and said driven pulley, and means operative to pivot said motor between a pair of positions including a first spring disposed and adapted to urge the motor to one position to exert a belt tensioning force insufficient to move said pulley sections apart, and a second spring disposed and adapted selectively to urge the motor to said other position to exert a belt tensioning force sufficient to urge said split pulley sections apart, thereby to cause drive of said belt by a lesser effective diameter of said split pulley.

5. Drive mechanism comprising: a drive shaft mounted for movement between a pair of rest positions and in a direction transverse its axis; a driven shaft; a pair of pulleys, one pulley being mounted on said drive shaft and the other pulley mounted on the driven shaft for rotation with said shafts, said one pulley having a pair of sections, each section being provided with angular adjacent faces, one of said sections of the said one pulley on said drive shaft being movable axially toward and away from the other section; a belt extending around the pulleys and disposed in contact with said faces; a spring urging said movable pulley section toward the other section and into engagement with said belt; a first belt tensioning spring urging said drive shaft to one of its rest positions to tension said belt in an amount ineffective to overcome the spring of the drive shaft pulley to move its movable section away from the other section; and means operative, selectively, to move said drive shaft between said rest positions and including a second belt tensioning spring disposed and adapted to move said drive shaft to the other of its rest positions thereby to tension the belt in an amount effective to overcome the spring of the drive shaft pulley and move the movable section away from the other section.

6. In apparatus of the type including a first pulley adapted to be driven at different speeds, and a second pulley spaced from the first and adapted to be driven at constant speed, drive means comprising: a motor; a motor shaft; means pivotally mounting said motor about an axis spaced transversely from said shaft, said motor being pivotal between a pair of positions, the distances between said shaft and said second pulley being substantially the same in correspondence to each position of said motor and the distances between said shaft and said first pulley being different in correspondence to each position of said motor; a split pulley comprising a pair of sections relatively movable along and carried by said shaft; means normally resiliently urging said sections toward one another; a third pulley which is carried by said shaft; a first drive belt interconnecting said split pulley and said first pulley; a second drive belt interconnecting said second and third pulleys; and means selectively operative to pivot said motor between said pair of positions, said first belt in one motor position being driven by said split pulley in its normal position, and the motor in the other position tensioning the belt to urge said split pulley sections apart thereby to cause drive of said first belt by a lesser effective diameter of said split pulley and to change the speed of said first pulley, said motor in either position driving said second belt at the same speed.

7. Apparatus of claim 6 wherein said first pulley is disposed and adapted to drive agitator and centrifuging mechanism and said second pulley is disposed and adapted to drive washing fluid drain pump mechanism.

8. In combination, a first pulley to be driven at variable speed, a second pulley to be driven at constant speed with said first pulley, a constant speed motor including a shaft, a third and fourth pulley each carried by said shaft, said third pulley including a pair of sections relatively movable along the pulley axis to vary the effective diameter of said third pulley, means for moving said motor between a pair of rest positions to vary the distance between said first and third pulleys without changing the distance between said second and fourth pulleys, a first drive belt encircling said first and third pulleys, a second drive belt encircling said second and fourth pulleys, movement of the motor between its rest positions being operative to vary the tension in said first drive belt in amounts sufficient to move said third pulley sections apart thereby to vary its effective diameter and correspondingly change the speed at which said first pulley is driven.

9. In combination, a first pulley to be driven at variable speed, a second pulley to be driven at constant speed with said first pulley, a constant speed drive shaft, a third and a fourth pulley each carried by said shaft, said third pulley including a pair of sections relatively movable along the pulley axis to vary the effective diameter of said third pulley, means for moving said shaft between a pair of rest positions to vary the distance between said first and third pulleys without changing the distance between said second and fourth pulleys, a first drive belt encircling said first and third pulleys, a second drive belt encircling said second and fourth pulleys, movement of the shaft between its rest positions being operative to vary the tension in said first drive belt in amounts sufficient to move said third pulley sections apart thereby to vary its effective diameter and correspondingly change the speed at which said first pulley is driven.

References Cited in the file of this patent

UNITED STATES PATENTS

| | | |
|---|---|---|
| 2,314,415 | Morella | Mar. 23, 1943 |
| 2,325,649 | Batterson | Aug. 3, 1943 |
| 2,543,967 | Heyer | Mar. 6, 1951 |
| 2,869,699 | Bochan | Jan. 20, 1959 |